Feb. 8, 1966   E. J. HORRELL   3,233,447
LEAK INDICATOR SYSTEM
Filed April 24, 1963   3 Sheets-Sheet 1

INVENTOR.
Earl J. Horrell
BY WHITEHEAD, VOGL & LOWE
PER Frank C. Lowe
ATTORNEYS

Feb. 8, 1966  E. J. HORRELL  3,233,447
LEAK INDICATOR SYSTEM
Filed April 24, 1963  3 Sheets-Sheet 2

INVENTOR.
Earl J. Horrell
BY WHITEHEAD, VOGL & LOWE
PER Frank C. Lowe
ATTORNEYS

3,233,447
LEAK INDICATOR SYSTEM
Earl J. Horrell, 816 Florence, Aurora, Colo.
Filed Apr. 24, 1963, Ser. No. 275,256
11 Claims. (Cl. 73—46)

This invention relates to leak testing in hydraulic actuating systems, and more particularly to methods and apparatus for detecting, locating, and measuring leakage which may occur in the various components of an hydraulic actuating system. The primary object of the invention is to provide an improved and simplified method for detecting, locating, and measuring leakage in hydraulic systems and for improved detecting apparatus for so effectuating the desired results.

The invention is especially adapted for use with closed-circuit, high-pressure hydraulic actuating and working systems which are being commonly used for the controls of aircraft and for the controls and working mechanisms of heavy machinery, and where, with working pressures which may be as great as 3000 pounds per square inch, the slightest leak may be a critical factor. Accordingly, the invention will be hereinafter described as being applied to high-pressure hydraulic actuating systems and will be referred to as a method and apparatus for leak analysis in high-pressure hydraulic systems. The apparatus itself will be hereinafter called analyzer or leak detector.

The invention is also especially for use with operative mechanisms which are designed to permit a small leakage. Such mechanisms usually wear in a manner which causes an increase of the leakage rate and when such can be measured, the same will indicate the comparative extent of wear of the mechanism.

The conventional hydraulic system, as for the controls of an aircraft, consists of pressure and return lines which extend from a pump and reservoir respectively, to branch out to a number of actuating hydraulic cylinders at the various controls such as at the landing gears, flaps and brakes. The cylinders may have single or double acting pistons and are controlled by three-way or four-way type valves in the pressure and return lines connected with them. Such systems also include suitable check valves, accumulators, bypass and relief valves and pressure gage indicators and actuators such as motors and pistons. It follows that there are many possibilities of leakage occurring in any such complex hydraulic system with such leakage being internal as well as external as where a four-way valve leaks to bypass fluid directly from the pressure to the return lines of the system.

A large-flow leakage of a severe nature, as past a ruptured piston seal is quickly and easily located by an operational failure of the actuating apparatus; however, it may be very important to avoid such leakage and failure and this is possible if the leakage past the questionable component can be detected before it becomes severe. In practically every instance, the sealing component of an operational member such as a piston seal will evidence a small-flow leakage before it becomes severe and thus, if such leakage can be detected in advance, repairs can be made to the questionable components.

Such leakage and especially internal leakage in a complex system may be very difficult to detect and locate especially if the rate of leakage is not very great. Actually, in some instances a small amount of leakage, as at a valve, may not be serious and may be eliminated at any convenient time as during a routine overhaul. However, in other instances, a small leakage is important to note for it presages a serious condition if not taken care of as soon as it is detected.

Any overhaul and repair of a hydraulic system is apt to be quite expensive and it is important to detect and locate leaks to establish the source of trouble and the potential severity of the leak before any extensive special overhauls are made. The common practice in testing of this nature is to periodically separate the hydraulic lines at selected locations as to check any flow through such lines when selected valves are closed in such a manner as to cut off flow from such lines if there is no leakage. Special apparatus is not necessary to facilitate testing of this type.

The disadvantages of such leak testing methods are obvious. Small leaks often cannot be detected in advance, and the overhaul may be completely unnecessary. Moreover, the procedure is slow and time-consuming, and the separation of connections in high pressure fluid lines is undesirable because of the possibility of air pockets forming in the lines and because of the difficulty of reconnecting the lines without creating new leaks. Also, as is often the case in a complex system, an operator may disconnect the wrong line with a resultant spray and shower of high-pressure fluid from the connection. Even with special taps provided for leak-checking operations, the disadvantages of opening the lines of a high-pressure hydraulic system cannot be avoided.

The present invention was conceived and developed in order to obviate such disadvantages of conventional leak testing methods, and comprises, in essence an operation using shut-off-by-pass leak detectors at selected stations in the lines of a hydraulic system to obtain a quick, simple leak analysis of the system. It is to be understood that such analysis is possible only when the actuator system is not operating and when the components of the system are held in a fixed position, as where a piston is moved to an extreme position in its cylinder or the control valves are shut off to prevent line flow through the system regardless of the position of the piston.

Accordingly, further objects of the invention are to provide a novel and improved leak detector for installation in a line of a hydraulic actuator system which eliminates the need for opening the line of the system in order to check for leak indications; measures a leak flow through the line under pressure and may also be used to measure leak flow through either a high-pressure or a low-pressure return line; permits the detection of minor leaks not ordinarily noticeable by ordinary testing methods; actually measures the amount and direction of leak flow through the line wherein it is installed and in conjunction with simple test procedure routines permits inductive appraisal of the severity and source of a leak and permits an inductive appraisal of the severity of wear of a moving part; permits leak check measurements to be made quickly and easily by simple manual operations; permits quick leak checks which can be made frequently and thereby reduces the need for frequent systematic overhauls of the system; and by leak location permits proper repair of the hydraulic system with an absolute minimum of expense.

A further object of the invention is to provide novel and improved leak detectors for installation in selected lines of a complex high-pressure hydraulic actuator system which are capable of measuring the amount and direction of leak flow through such lines and permits, in conjunction with simple test procedures and routines, an inductive appraisal of the source and severity of a leak in the system without the necessity of disconnecting many lines and overhauling many components of the system in order to locate and correct a specific leak.

Further objects of the invention are to provide a novel and improved leak detector for hydraulic actuator systems which is a simple, low-cost, easily-installed, easyto-use, reliable, rugged and durable unit, and which incorporates in its construction safety features to prevent accidental closure or blocking off of the hydraulic lines of the unit.

The invention will now be described in detail with reference to the drawing.

Figure 1:
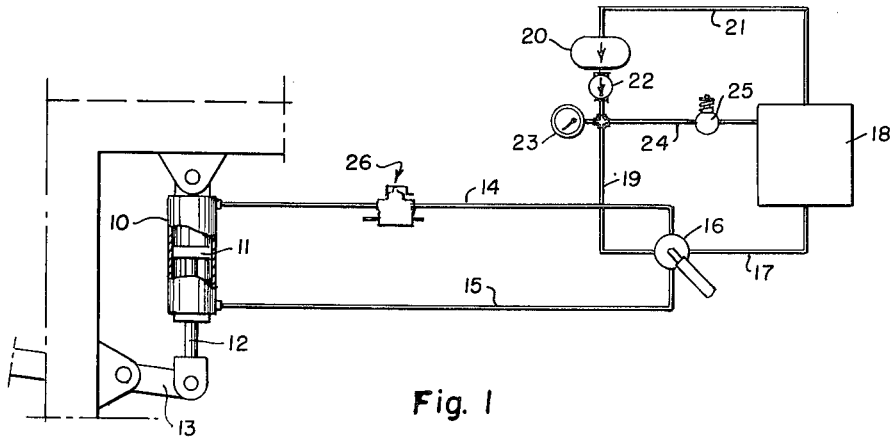
FIGURE 1 is a diagrammatic illustration of a basic double-acting hydraulic actuator system illustrating a leak detector installed in an operating line of the system according to the principles of my invention.

Referring more particularly to FIG. 1 of the drawing, a representative hydraulic actuator system illustrated therein is adapted to operate a cylinder 10 having a piston 11. The piston rod 12 thereof extends from the cylinder to operate a mechanical linkage 13. Such a linkage may be for any of a number of mechanical arrangements which require back-and-forth work action capable of being produced by the cylinder.

The hydraulic system includes an extension line 14 connected to the base of the cylinder and a retraction line 15 connected to the opposite end of the cylinder. These lines, in turn, connect with opposing outfeed ports of a conventional type of 4-way control valve 16. An intermediate exhaust port of the 4-way control valve 16 connects with a low-pressure exhaust line 17 which discharges into and terminates at a storage tank 18. The infeed port of the 4-way valve, opposite the exhaust port, connects with a high pressure line 19 which, in turn, connects with discharge side of a pump 20. The intake side of the pump, in turn, connects with an intake line 21 which extends to the storage tank 18 to complete the basic system.

Certain auxiliary features are usually found in even the most simple system. These include a check valve 22 in the pressure line adjacent to the pump, a pressure gauge 23 in the pressure line and a bypass line 24, having a pressure relief valve 25, which extends from the pressure line 19 to the storage tank 18.

Operation of this basic system to extend the piston rod 12 is accomplished by setting the 4-way valve 16, as from its off position to a first "on" position which connects the pressure line 19 with the extension line 14, and connects the retraction line 15 with the exhaust line 17. So set, flow of liquid through the extension line 14 fills the base of the cylinder to extend the piston rod 12 and at the same time to exhaust fluid from the end of the cylinder which passes through the lines 15 and 17 to the storage tank 18. An opposite setting of the 4-way valve 16 to a second "on" position connects the pressure line 19 with the retraction line 15 and connects the extension line 14 with the exhaust line 17. So set, the flow of liquid through the operating line fills the end of the cylinder to retract the piston rod 12 and at the same time exhaust fluid from the base of the cylinder through lines 14 and 17, and to tank 18.

External leaks in a system of this type may ordinarily occur at the control valve 16 or at the end of the cylinder from where the piston rod 12 extends as well as from faulty or ruptured lines or connections. Such leaks are usually easy to detect by simple observation, but this is not always the case as where the system or portions of it are enclosed.

Internal leaks are not so easy to detect. They may occur past the piston 11, at the 4-way control valve 16, the check valve 22 or at the relief valve 25. Such leaks are often difficult to even detect because no external manifestations may exist or even if so they cannot be pinned down. For example, the symptoms of a leaking piston are indicated by slow movement of the piston when the control valve 16 is closed and the rod 12 is under load from an external force. However, the trouble may not be a leaking piston at all for it may be caused by a leaking valve 16. Thus conventional trouble shooting methods may require overhaul of both the piston and valve or at least disconnection of several lines to ultimately locate the leak. It is to be emphasized at this point that the arrangement at FIG. 1 is very simple and that in more complex systems such as will be hereinafter described, this problem of unnecessary disconnection of lines and overhaul of parts can become serious.

In my improved method of leak detection, I incorporate into a selected line of the system a leak detector 26 which senses a very slow flow of fluid through the line and also the direction and rate of such flow. In the simple system illustrated at FIG. 1, one suitable location of the leak detector 26 is in the extension line 14. A detector, so placed, can give much information as to the location and extent of a leak. By determining if any line flow exists when the piston rod 12 is partially extended and externally loaded and with the valve 16 being closed, to set the position of the piston except for creeping because of the leak, the location of the leak, whether at the piston or at the valve 16, can be immediately established. Also, a leak past the piston can be measured when the piston is at a fully extended position and the control valve 16 is held open. Also, a leak at the check valve 22 or bypass valve 25 can be detected by externally loading the piston, opening the valve 16 and shutting off the pump 20.

Once the basic concept of using a leak detector in combination with selected tests is fully appreciated, a technician can set up a system of procedures on a comparatively complex system using detectors in selected lines of the system as will be hereinafter illustrated in further detail.

Figure 2:
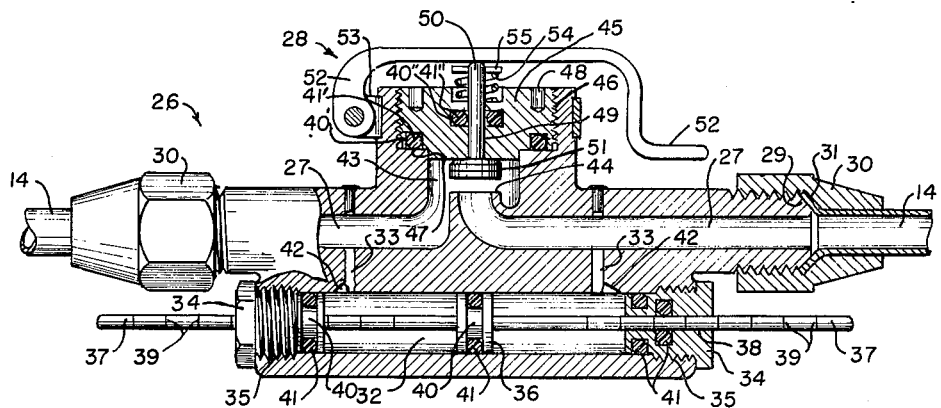
FIGURE 2 is a side elevation view of a leak detector constructed according to the principles of the invention but with portions being broken away and in section to illustrate internal constructions thereof.

One preferred form of a leak detector 26 is illustrated at FIG. 2. It is contemplated that the unit will be permanently incorporated in a line of an hydraulic system, such as in line 14 of FIG. 1. The body of the detector 26 is thus formed as a rigid, elongated member having a main-flow passageway 27 extending therethrough interrupted by a normally open shut-off valve 28 as hereinafter described. To connect this detector in a line, such as line 14, each end of the body is suitably threaded and chambered about the ends of the passageway as at 29 to hold a standard tube connector nut 30 and to seat a flared tube-end 31 of the line 14. It is contemplated that such line connections may be by any other conventional fittings or even by welding should such be desirable.

A longitudinally extended measuring cylinder 32 is formed in this body alongside and paralleling the passageway 27 and a lateral drill-hole 33 is located near each end of this cylinder to communicate with the main passageway 27 at each side of the valve 28. This cylinder is closed at each end by cap nuts 34 which fit into threaded sockets 35 at the cylinder ends. A piston 36 is slideably mounted in this cylinder and an axially centered indicator rod 37 extends from at least one and preferably both sides of this piston, the indicator rods 37 extending through suitably axially centered passageways 38 in the cap nuts 34 to permit their projecting ends to be observed. Suitable markings 39 may be etched on the plunger rods to indicate the volume of the cylinder to permit flow rate measurements by simply timing the movement of the rods 37.

Suitable packing or sealing means is provided at each cap nut connection, at the piston and at the passageways 38 through the nuts. For high pressure installations conventional O-ring gaskets are preferred and suitable circular grooves 40 are cut in the cap nuts, piston and passageway walls to receive properly sized O-ring gaskets for tight, reliable seals. It is to be understood, however, that other types of gaskets and seals may be also used.

Figure 3:
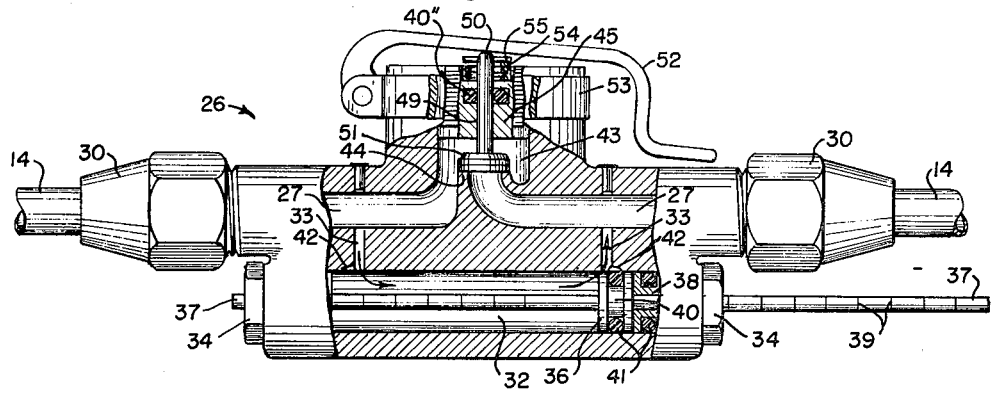
FIGURE 3 is a side elevation view, similar to FIG. 2, but with the leak indicating mechanism of the detector as being in an extreme operative position.

To complete the cylinder assembly, each communicating drill hole 33 is flared at its exit into the cylinder by a slot 42 between the hole exit and the adjacent cap nuts 34. This slot is to provide a pressure relief passageway and permit the piston 36 to move past the hole exit and against the cap nut to an extreme position as illustrated at FIG. 3. This provides a safety feature for if the valve 28 in the main passageway is accidentally held closed flow past the leak detector is possible by being circuited through the cylinder 32 as in the manner indicated by the arrows at FIG. 3.

The valve 28 is preferably a manually operated, self-opening structure. In the unit illustrated, the valve is formed within an enlarged cylindrical opening 43 outstanding laterally from one side of the passageway 27 at the center of the detector. One side of the passageway connects directly to the opening. The top of this opening 43 is closed by a bonnet 45 which is turned into a threaded socket 46 to bear against a circular rabbeted ledge 47 in the opening 43. To effect a sealed closure of the bonnet in the socket an O-ring 41' is set in an annular groove 40' at the underside of the bonnet to bear against the ledge 47. The threaded bonnet 45 may extend above the body 26 or it may be formed as a flat top unit flush with the top of the body as illustrated. It may be tightened in place by a spanner wrench, not shown, which will fit into a pair of spaced holes 48 in the top of the bonnet.

An axially centered passageway 49 extends through the bonnet directly over the seat 44 and a valve stem 50 is mounted in this passageway. The stem carries a valve head 51 which is adapted to move against the seat 44 to close the valve 28. A groove 40" is formed in the bonnet in the passageway 49 to hold an O-ring 41" which functions as a packing for the valve stem 50.

Under static, substantially balanced, pressure conditions within the leak detector, as during a test, or otherwise, a force is exerted against the head which tends to hold the valve open. This force is proportional to the cross sectional area of the stem 50 and under high pressure it will be considerable, even with a small diameter stem. For example, using a stem having a diameter of 0.15 inch, for a pressure of 3000 pounds per square inch, the unbalanced force will exceed 50 pounds. This is too great for simple manual operation of the valve stem and a lever will be required. A suitable lever 52 may have one end pivotally mounted to a support ring 53 affixed about the body portion of the detector holding the bonnet as illustrated.

Any substantial pressure in the line where the leak detector is installed will hold this valve open automatically and it is contemplated that no problem will exist because of accidental or improper closure of the valve 28, for whenever the manually operated lever is released, the valve will snap open. Moreover, should it accidentally stick closed the communicating holes 33 at each side of the valve will permit continued operation of the unit as hereinbefore explained. However, to assure opening of the valve as during low pressure operation of the line when it is in the exhaust side of the system, a spring 54 is mounted under the lever 52 and is connected with the top of the stem 50 as by a pin 55 as illustrated.

Leak testing by this detector may be according to several simple procedures which will be described with respect to the arrangement illustrated at FIG. 1. A first test to check a leak in the piston 10 or the valve 16 may be made if a creeping of the piston is observed when it is attempted to hold it in position under load. In this test, the piston is partially extending, externally loaded and the control valve 16 is closed. The indicator rods 37 of the detector 26 are set to a neutral position and the detector valve 28 is closed. If the creeping movement of the loaded piston is accompanied by movement of the indicator rods 37, the leakage is probably at the control valve 16 and not at the piston. If no movement of the indicator rods 37 is observed, the leakage is at the piston. Next, if movement is occurring, the movement of the indicator rods 37 compared with corresponding movement of the piston will, by simple calculations, determine if the leakage is at both the piston and the valve. If there is no leakage at the piston, the valve 16 may be opened and the pump 20 may be shut off. If the movement of the indicator rods 37 is materially increased, there is then a suggestion that the check valve 22 or the pressure relief valve 25 may also be leaking. This test may be made positive after repair of the valve 16. If the piston is leaking as indicated by lack of movement of the indicator rods 37, the piston may then be mechanically locked against further movement, as by fully extending it, the valve 16 opened and the pressure flow from the pump will permit the indicator rods 37 to measure the rate of leakage past the piston.

Figure 4:
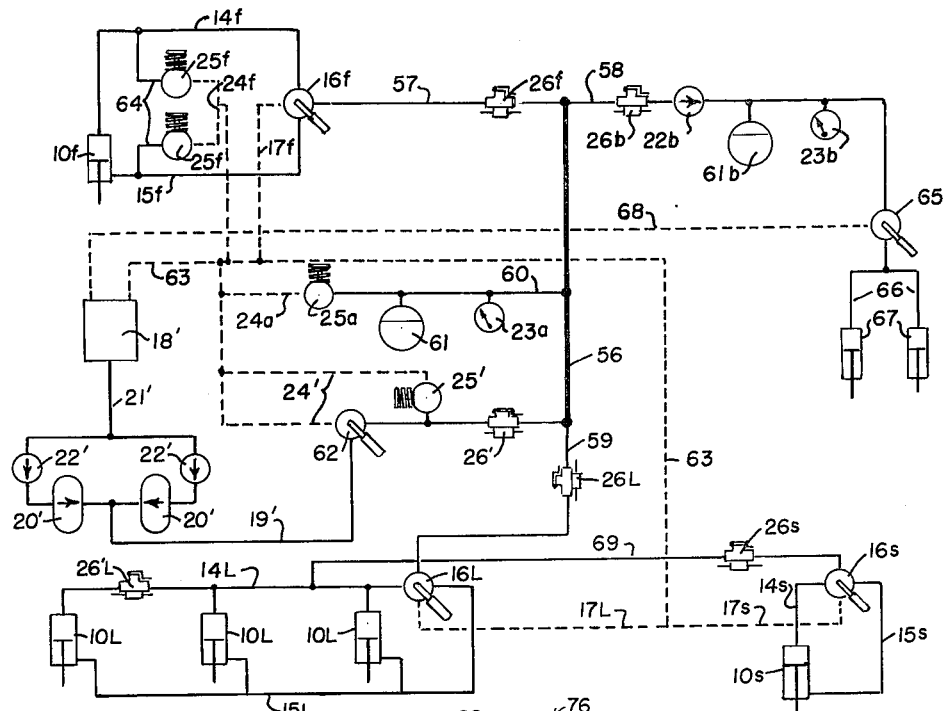
FIGURE 4 is a diagrammatic illustration of a more complex hydraulic actuator system, exemplifying a system such as used in aircraft, and illustrating several leak detectors installed in selected pressure lines of the system to permit the location and severity of a leak in the system by simple operational procedures with the leak detectors.
Figure 5:
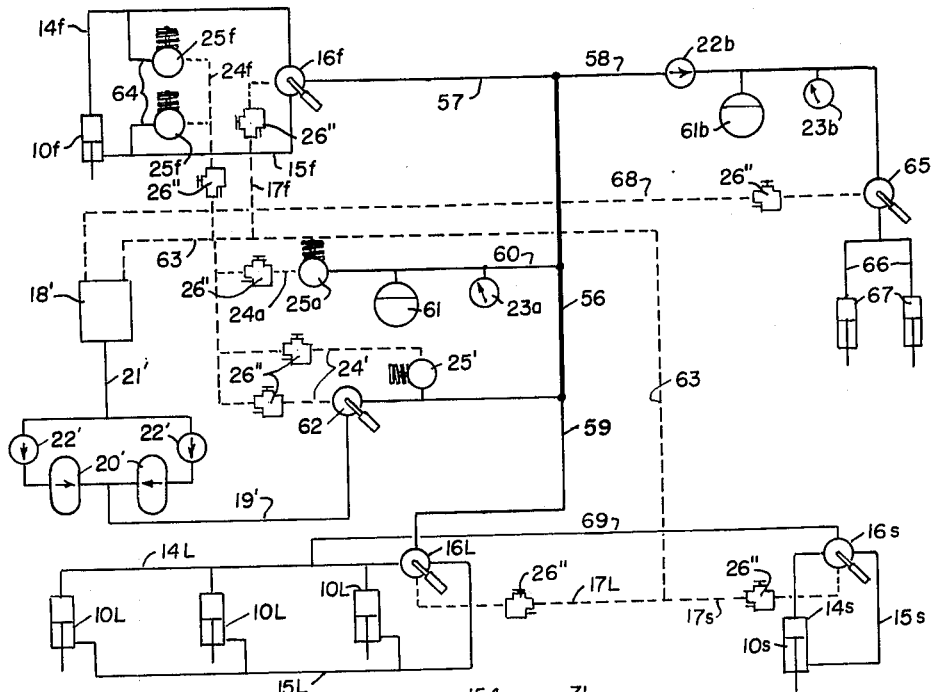
FIGURE 5 is another diagrammatic illustration of the hydraulic actuator system of FIG. 4 but with the leak detectors being installed in the return lines of the hydraulic circuits to illustrate another arrangement wherein leak detection operations may be made.

It is manifest that the principles of leak testing as outlined above for the simple system of FIG. 1 can be applied to more complex hydraulic systems, such as exemplified at FIGS. 4 and 5. This more complex system, representative of part of the controls for an aricraft, includes pumps, a pressure line which extends to a number of actuator systems and several types of controls and return lines which connect with a reservoir 18'. Describing the FIG. 4 system in detail, an intake line 21' extending from reservoir 18' bifurcates to the intake side of a pair of pumps 20' with a check valve 22' being in each leg of the intake beyond the point of bifurcation. Thence, the pumps connect with a common high-pressure line 19'. This high-pressure line 19' connects with a manifold section 56, with a first branch 57 extending to the landing flap system; a second branch 58 extending to the brakes; a third branch 59 extending to the landing gear and steering system and a fourth branch 60 extending to an accumulator 61 which controls pressure surges as the system is operated. There is also located in the high-pressure line 19' a manually operated bypass valve 62 and a pressure-relief valve 25', both these valves being connected with bypass lines 24' which join with return line 63 extending to the storage tank 18'.

The flap control branch 57 extending from the manifold 56 connects with the intake of a 4-way control valve 16f. An extension line 14f and retraction line 15f extend from this 4-way valve to an actuating cylinder (or cylinders) 10f. Since severe pressure fluctuations will occur when the landing flaps are operated, each line 14f and 15f includes a bypass line 64 having a pressure relief valve 25f. A discharge line 24f extends from each pressure relief valve and to the return line 63. Likewise, the discharge branch of the valve 16f is connected with an exhaust line 17f which extends to the return line 63.

The brake system branch is arranged somewhat differently from that heretofore described. This branch includes a check valve 22b, accumulator 61b and a pressure gauge 23b. The line extends to the intake of a 3-way control valve 65 with one branch of the control valve extending through a pressure line 66 to single acting brake pistons 67. A special discharge line 68 extends from the 3-way valve 65 to return to the storage reservoir 18'.

The landing gear and steering system branch 59 extends to a 4-way control valve 16L. An extension line 14L and a retraction line 15L extend from the 4-way valve to several landing gear cylinders 10L which are connected in parallel. The discharge line 17L from the control valve extends to the return line 63. A high-pressure line 69 is connected in the landing gear extension line 14L to extend to a steering 4-way control valve 16s. An extension line 14s and a retraction line 15s extend from this control valve and a steering cylinder 10s. The exhaust line 17s from the control valve conveniently connects with the exhaust line 17L to extend to the return line 63.

The surge branch 60 extending from the manifold 56 includes the accumulator 61, a pressure gauge 23a and a pressure relief valve 25a. A bypass line 24a extends from this pressure relief valve and to the return line 63.

Leak detectors 26, as heretofore described, may be spotted in the various lines of this system in a manner which will permit analysis of leak indications. A first leak indicator 26' may be spotted in the line 19' near the manifold 56 to establish leaks which occur in this pressure line such as at the check valve 22', the bypass valve 62 or the pressure-relief valve 25'.

The flap system branch may include a leak detector 26f, the brake system branch 58 may include a leak detector 26b, and the landing gear branch 59 may include a detector 26L. A detector is not needed in the surge branch 60 since a leak in that branch would be indicated by a process of elimination in checking out the other branches. However, a steering-branch leak detector 26s is desirably installed in the line 69.

The detector 26f in the flap system branch will indicate a leak anywhere in the flap system such as at the cylinder 10f, or the valve 16f or the pressure-relief valve 25f. Should additional measurements be desirable, another leak detector can be installed in any of the various lines of the flap system such as in the line 14f to operate in the manner heretofore described in conjunction with the arrangement illustrated at FIG. 1. Likewise, an additional leak detector may be installed in any of the other branches. This is especially desirable for the landing gear system. The usual landing gear system for an aircraft includes two main wheels and a third front wheel. All of these wheels are ordinarily lowered and raised at the same time and by the same control valve. However, because of their spacing in the airplane, an additional leak detector 26'L is desirable in the branch 14L extending to the front wheel.

It is to be noted that this arrangement of leak detectors as above described, will spot the location of the branch wherein a leak exists. They will also permit further analysis of a leak by directional and volumetric flow indications through simple tests as by externally loading the pistons of the cylinders in opposing direction and shifting the 4-way valves to various positions. For example, the piston in the flap cylinder 10F may be loaded to place the pressure on the line 14f and a directional leak measurement may be taken at the indicator 26f. The piston may then be loaded oppositely and the 4-way valve shifted to place pressure at line 15f and the leak indicator movement then measured. A third test will be with line pressure against a closed valve 16f to determine the possibility of leakage at that source. Finally, two additional tests with the valve 16f open both directions respectively and with the piston being at its extreme positions. Such tests will establish whether the leakage is at the piston, the 4-way valve or the pressure relief valves.

FIGURE 5 shows the same hydraulic system as at FIG. 4 but with leak detectors 26" placed in each discharge line in the system. This arrangement of leak detectors permits measurement of leakage flow only in the low pressure lines and thus cannot produce the results above described when measurements of leak flow are made in a pressure line in conjunction with selected tests. However, by placing leak detectors 26" in the discharge lines 24f, 17f, 68, 17s, 17L, lines 24a and 24', the location and extent of leaks in the various branches can be quickly determined. Moreover, an advantage of this arrangement lies in the fact that it is comparable to conventional leak testing methods where the discharge lines are disconnected to permit actual observations of leak flow and the mechanics checking out the system with the improved leak detectors need not be instructed in new procedures.

Figure 6:
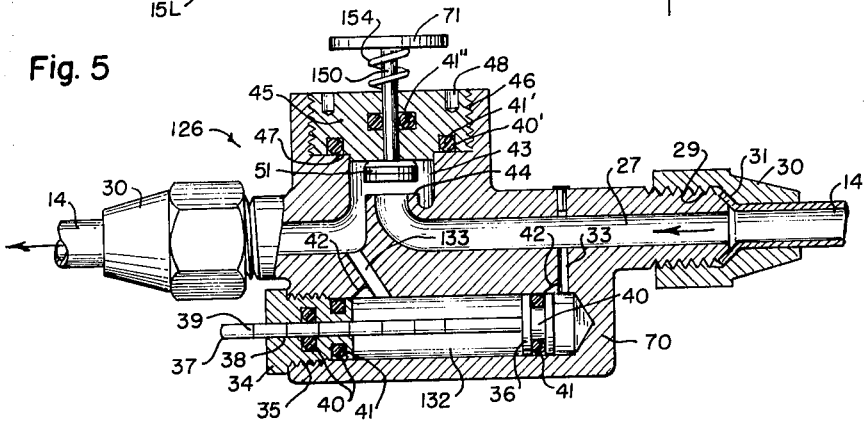
FIGURE 6 is a side elevation view, with portions being broken away and in section, of a leak detector of a more simplified construction and which is especially adapted to be used in connection with the arrangement illustrated at FIG. 5.

The leak detector 126 illustrated at FIG. 6 is a simplified form of the unit illustrated at FIG. 2, having only a single indicator rod 37 extending from one side of a shortened cylinder 132 as through a cap nut 34 as hereinbefore described. The opposite end of the cylinder is closed off as by a wall 70 which may form part of the basic structure. The unit 126 as illustrated is especially adapted for use in a low pressure system using a head 71 on a modified valve stem 150 instead of the lever heretofore described and a stronger retraction spring 154 to hold the valve open when it is not in use. Other changes to adapt this unit for directional indications as hereinbefore described are merely to adapt it to the shorter, single-opening cylinder 132. This includes a modified communicating drill hole 133 at one side because of the shortness of the body of the unit 126.

This modified detector 126 is especially adapted for use at the discharge lines as the units 26" illustrated at FIG. 5. For that purpose, the detectors may be simplified since directional indications of flow are not required. The fluid need fill only one side of the cylinder 132 and accordingly, the O-ring gaskets 41 in the cap nut 34 may be eliminated. This will also require elimination of the communication drill hole 133 and the flared bypass slots 42 at the end of the drill hole 33 to prevent leakage. When thus modified the unit 126 must be placed in a return line so that the flow therethrough will be in the direction of the indicated arrow in the passageway 27 at FIG. 6.

Figure 7:
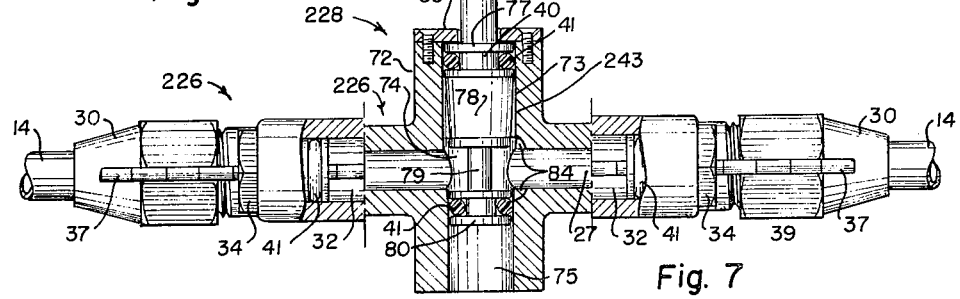
FIGURE 7 is a side view, with portions of the structure being broken away and in section, of a modified form of a leak detector, similar to the type illustrated at FIG. 2 but having a modified shut-off valve.

The modified leak detector 226 illustrated at FIG. 7 has the same general features as the unit illustrated at FIG. 2 except for a modified valve 228 which is especially adapted for easy operation under high pressures. This is a plug-plunger type valve and to suitably space it on the detector, it is oriented along an axis which lies normal to the plane defined by the axes of the passageway 27 and the cylinder 32, 90 degrees from the position of the valve 28 at FIG. 2.

This plug valve 228 is formed within a head 72 as a cross on the body portion of the detector having the passageways 27. The modified opening 243 traverses the passageway 27 and extends completely through the head 72. It consists of three axially-aligned segments, an upper, larger-diameter cylindrical sealing segment 73, a central conically-tapered seating segment 74 at the passageway 27 and a lower reduced diameter cylindrical sealing segment 75. A plunger 76 is slideably carried in this opening 243 and consists of an upper sealing head 77, a tapered closure plug 78, a spacer rod 79 and a lower sealing head 80. The plunger 76 also includes a shank 81 which upstands from the upper sealing head 77, to extend above the valve head 72 to carry a pushbutton 82 at its top for manual operation of the valve. A retainer ring 83 is affixed to the top of the head 72 to hold this plunger in place as illustrated.

Each sealing head, 77 and 80, is provided with a groove 40 and O-ring gasket 41 to prevent leaks and the plunger is proportioned so that the upper sealing head slideably fits into the cylindrical segment 73 and the lower sealing head slideably fits into the cylindrical segment 75. When in its raised position, the spacer rod 79 is in the tapered seating segment 74 to permit uninterrupted flow through the passageway 27 but when the plunger is depressed as by pushing button 82, the tapered plug 78 seats in segment 74 to effect closure of the passageway 27.

Slot-like flares 84 are provided at the top and bottom of one side of the entrance of passageway 27 into the seating segment so that a full hydrostatic pressure is always acting upon the O-ring gaskets when the plug is seated and is closing off the passageway. This imposes an unbalanced force upon the plunger which is proportional to the difference in the area between the larger diameter and smaller diameter sealing segments 73 and 75. It is apparent that a selected operating force on the plunger can be obtained for any given working pressure of the hydraulic system by proper selection of the diameter of these sealing segments. To complete this unit, a compression spring, not shown, may be placed about the plunger shank 81 between the retainer ring and button 82, should it be desirable to provide for positive opening action of the unit.

Figure 8:
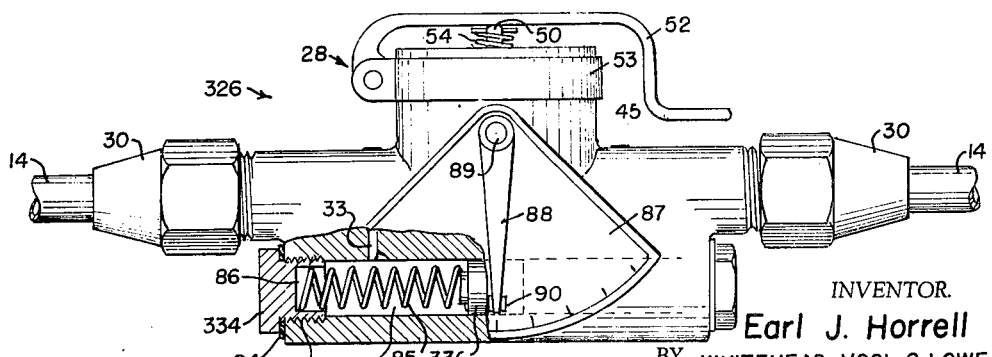
FIGURE 8 is a side view, with portions of the structure being broken away and in section, of another modified form of a leak detector, similar to the type illustrated at FIG. 2 but having fully enclosed indicator components.

The modified leak detector 326 illustrated at FIG. 8 has the same general features as the unit illustrated at FIG. 2 except for a modified indicating device which eliminates the plungers 37 of the FIG. 2 device. In this unit 326, the ends of the measuring cylinder 32 are closed by solid cap nuts 334 and sealed by gaskets 84. The body of this detector 326 is formed of non-magnetic material and the modified piston 336 is formed of magnetic, magnetized material. This piston has no extension plungers and is formed as a floating unit within the cylinder. Opposing compression springs 85 extend from each side of the piston to the end cap nuts 334 and each cap nut includes a convenient socket 86 to center and hold the abutting spring. The side face of the body of the unit 326 is formed with an indicating sector 87 whereon a pointer arm 88 is pivotally mounted as at 89 to extend to a position adjacent to the piston 336. A magnetic magnetized tip 90 is affixed to the end of the pointer. To complete the unit, the sector may be inset in the body and a glass cover may be placed over the arm in any convenient manner.

Operation of the unit is substantially as that hereinbefore described except that adjustments to the indicator are unnecessary. The opposing springs 85 tend to move the piston 336 to a centered position whenever the pressures thereon are balanced, as with the valve 28 being open. Since the spacing between the magnetic piston and magnetized tip 90 is not great, the attraction is sufficient to make the arm move with the piston indicating leak flow in the line.

While I have now described my invention in considerable detail, it is obvious that others skilled in this art can build and devise alternate and equivalent constructions which are within the spirit and scope of my invention. Hence, I desire that my protection be limited, not by the constructions herein illustrated, and described, but only by the proper scope of the appended claims.

I claim:

1. A method for locating and evaluating leakage in an hydraulic actuator system of the type having component groups of hydraulic operational members interconnected by pressure lines and having, in a selected pressure line, a shut-off means and a directional, flow-measuring bypass means shunting the shut-off means and including the steps of:
    (a) establishing the system at a state of pressurized static equilibrium, wherein all flow through the lines is halted except for flow from leakage effects;
    (b) closing the shut-off means in said selected pressure line to force any leakage-effect flow in the line through the bypass; and,
    (c) measuring the amount and direction of the leakage-effect flow in said bypass.

2. A method of evaluating leakage of an operating member of an hydraulic actuator system having a pressure line extending to the member, a shut-off means in the pressure line, and a directional, flow-measuring bypass means shunting the shut-off means and including the steps of:
    (a) operatively loading and positioning the member at a position of loaded, static equilibrium where the flow in the pressure line is halted except for flow from leakage effects;
    (b) closing the shut-off means to force leakage-effect flow in the line through the bypass; and,
    (c) measuring the amount and direction of the leakage-effect flow.

3. A leak detector for an hydraulic actuator system adapted to be installed in a line thereof and to measure the amount and direction of flow such as leakage-effect flow in the line when the actuator system is at a position of pressurized static equilibrium and comprising:
    (a) a body structure having a passageway therethrough, and a connecting means at each end of the passageway adapted to interconnect the body in said line whereby the hydraulic flow through the line is uninterrupted during normal use of the actuator system;
    (b) a normally-open valve traversing the passageway was adapted to close, to shut off the passageway, as for a leak test;
    (c) a bypass line in the body structure having the ends thereof interconnecting with the passageway at opposite sides of the valve whereby to effect a shunting of flow around the valve whenever it is closed; and,
    (d) flow-measuring means in the bypass line adapted to measure the shunted flow therein.

4. In the leak detector defined in claim 3, wherein said flow-measuring means include a cylinder, a piston therein and means associated with the piston to indicate its movement responsive to the flow in the bypass line.

5. In the leak detector defined in claim 3, wherein said flow-measuring means include a cylinder, a piston therein and an indicator rod on the piston extending from the cylinder to a position where its movement may be observed.

6. In the leak detector defined in claim 3, wherein said flow-measuring means include a cylinder, a piston therein, an indicator means on the surface of the body structure adjacent to the cylinder and magnetic means associated with the piston, and with the indicator means being adapted to cause the indicator means to follow the movement of the piston.

7. In the organization set forth in claim 6, including spring means in the cylinder adapted to move the piston to a base position whenever pressures in the piston are balanced, as when said valve is open.

8. In the leak detector defined in claim 3, said valve being a poppet-type valve having a seating member within the body and a stem projecting from the body and being adapted to be closed by pressing the stem inwardly and into the body.

9. In the leak detector defined in claim 3, said valve being a poppet-type valve having a seating means within the body, a push stem projecting from the body and being adapted to be closed by pressing the stem inwardly and into the body, and opposing pressure-resisting surfaces associated with the stem and seating means having selected unequal surface areas adapted to cause a selected unbalanced force on the stem responsive to the pressure in said line with the unbalanced force being adapted to push the valve to the open position.

10. A leak detector for an hydraulic actuator system adapted to be installed in a line thereof and to measure the amount and direction of flow such as leakage-effect flow in the line when the actuator system is at a position of pressurized static equilibrium and comprising:
- (a) an elongated body structure having a passageway therethrough and a connecting means at each end of the passageway to permit the body to be interconnected into said line and to permit uninterrupted flow through the passageway during normal use of the system;
- (b) a valve chamber interrupting the passageway with the interruped passageway forming a valve seat therein;
- (c) a valve in the chamber having a seating member adapted to move, from a normally open position, upon the valve seat to close the passageway and a stem projecting from the chamber;
- (d) an end-closed measuring cylinder in the body alongside the passageway having a bypass connection near each end thereof communicating with the passageway at each side of the valve; and,
- (e) a piston within the cylinder having an axially-extended rod thereon with the rod being adapted to extend from an end of the cylinder to expose the extended portion thereof.

11. A method of evaluating leakage of an operating member of an hydraulic actuator system having a line connecting to the member through which flow passing through the member passes, a shut-off means in the line, and a directional, flow-measuring bypass means shunting the shut-off means and including the steps of:
- (a) operatively loading and positioning the member at a position of loaded static equilibrium where the flow in the line is halted except for flow leakage effects;
- (b) closing the shut-off means to force leakage-effect flow in the line through the bypass; and,
- (c) measuring the amount and direction of the leakage-effect flow.

References Cited by the Examiner
UNITED STATES PATENTS

| 2,831,351 | 4/1958 | Jacobson | 73—204 |
| 2,936,611 | 5/1960 | Le Mat et al. | 73—49.2 |

LOUIS R. PRINCE, *Primary Examiner.*

ISAAC LISANN, *Examiner.*